(12) United States Patent
Kimata et al.

(10) Patent No.: US 9,369,032 B2
(45) Date of Patent: Jun. 14, 2016

(54) VEHICLE AC GENERATOR

(75) Inventors: Hirotaka Kimata, Tokyo (JP);
Kazunori Tanaka, Tokyo (JP)

(73) Assignee: Mitsubishi Electric Corporation,
Tokyo (JP)

(*) Notice: Subject to any disclaimer, the term of this patent is extended or adjusted under 35 U.S.C. 154(b) by 0 days.

(21) Appl. No.: 14/352,257

(22) PCT Filed: Jan. 10, 2012

(86) PCT No.: PCT/JP2012/050254
§ 371 (c)(1),
(2), (4) Date: Apr. 16, 2014

(87) PCT Pub. No.: WO2013/105212
PCT Pub. Date: Jul. 18, 2013

(65) Prior Publication Data
US 2014/0246959 A1    Sep. 4, 2014

(51) Int. Cl.
*H02K 57/00* (2006.01)
*H02K 5/08* (2006.01)
*H02K 11/00* (2006.01)
*H02K 99/00* (2014.01)
*H02K 11/04* (2016.01)

(52) U.S. Cl.
CPC ............... *H02K 57/003* (2013.01); *H02K 5/08* (2013.01); *H02K 11/046* (2013.01)

(58) Field of Classification Search
CPC ............. H02K 5/00; H02K 5/02; H02K 5/04; H02K 5/20; H02K 5/22; H02K 5/24; H02K 5/26; H02K 5/136; H02K 5/18; H02K 15/00; H02K 2205/00; H02K 2205/03; H02K 2205/06; H02K 2205/09

USPC ........ 310/43, 46, 48, 85, 88, 89, 154.17, 156, 310/424, 64, 68 D
See application file for complete search history.

(56) References Cited

U.S. PATENT DOCUMENTS

| 5,729,063 | A | * | 3/1998 | Adachi et al. | 310/68 D |
| 6,114,783 | A | * | 9/2000 | Asao | 310/58 |
| 6,285,100 | B1 | * | 9/2001 | Pflueger et al. | 310/68 D |

(Continued)

FOREIGN PATENT DOCUMENTS

| CN | 1816958 A | 8/2006 |
| JP | 5-15653 U | 2/1993 |

(Continued)

OTHER PUBLICATIONS

International Search Report of PCT/JP2012/050254, dated Apr. 17, 2012.

(Continued)

*Primary Examiner* — Terrance Kenerly
(74) *Attorney, Agent, or Firm* — Sughrue Mion, PLLC

(57) ABSTRACT

Provided is a vehicle AC generator that further enhances safety at the time of a vehicle collision, without resorting to changes in material or changes in overall thickness. A vehicle AC generator 50 has: a rotor 5 provided on a shaft 4; a stator 10 disposed so as to oppose the rotor; a rectifier 12 rectifying current generated in the stator; a regulator 13 adjusting voltage generated in the stator; and a resin cover 14 covering the rectifier. A partitioning section 15 is integrally formed on the inner side of the resin cover. The partitioning section extends in the peripheral direction and rises in the axial direction of the shaft.

6 Claims, 4 Drawing Sheets

(56) References Cited

U.S. PATENT DOCUMENTS

| | | | |
|---|---|---|---|
| 6,528,911 B1* | 3/2003 | De Petris | 310/64 |
| 6,657,336 B2* | 12/2003 | Morikaku et al. | 310/68 D |
| 2005/0151435 A1* | 7/2005 | Misaki | 310/89 |
| 2006/0175587 A1* | 8/2006 | Kasowski | 252/601 |

FOREIGN PATENT DOCUMENTS

| | | | |
|---|---|---|---|
| JP | 2005-204385 A | 7/2005 | |
| JP | 2009-95153 A | 4/2009 | |
| WO | 2011/064835 A1 | 6/2011 | |

OTHER PUBLICATIONS

Communication dated Dec. 23, 2015 from the State Intellectual Property Office of People's Republic of China in Application No. 201280066714.1.

* cited by examiner

VEHICLE AC GENERATOR

CROSS REFERENCE TO RELATED APPLICATIONS

This application is a National Stage of International Application No. PCT/JP2012/050254 filed Jan. 10, 2012, the contents of all of which are incorporated herein by reference in their entirety.

TECHNICAL FIELD

The present invention relates to a vehicle AC generator.

BACKGROUND ART

Vehicle AC generators provided with, for instance, a rectifier, a regulator, a brush holder and a resin cover (for instance, Patent document 1) are the most common vehicle AC generators. The brush holder has a brush for supplying electromagnetic current to a rotor. The resin cover is a bowl-shaped cover for protecting electric components such as the rectifier, the regulator and so forth.

Patent document 1: Japanese Utility Model Application Publication No. H5-15653

DISCLOSURE OF THE INVENTION

It is deemed that the resin cover of the vehicle AC generator may break and the internal components may suffer a direct impact when a vehicle AC generator receives an external impact, due for instance to a vehicle crash. In particular, generation of sparks during short-circuits cannot be ruled out if metal parts having a potential difference are deformed or come into contact with each other. The space between inner parts has decreased in recent years as engine rooms have become more compact. As a result, there arises a need to further increase safety at the time of a vehicle collision. A further need involves making the vehicle AC generator itself more compact, from the viewpoint of harness attachability.

At present, there are no resin covers strong enough as to withstand a collision, since the main purpose of the resin cover is to afford spatial protection of electric components. However, modifying the material of the resin cover to an impact resistant material, or increasing the thickness of the resin cover, gives rise to a new problem, namely the greater cost that doing so involves.

In the light of the above, it is an object of the present invention to provide a vehicle AC generator that allows further enhancing safety at the time of a vehicle collision, without resorting to changes in material or changes in overall thickness.

In order to attain the above goal, a vehicle AC generator of the present invention is a vehicle AC generator, having: a rotor provided on a shaft; a stator disposed so as to oppose the rotor; a rectifier rectifying current generated in the stator; a regulator adjusting voltage generated in the stator; and a resin cover covering the rectifier, wherein a partitioning section is integrally formed on the inner side of the resin cover; and the partitioning section extends in a peripheral direction and rises in an axial direction of the shaft.

The present invention succeeds in providing a vehicle AC generator that further enhances safety at the time of a vehicle collision, without resorting to changes in material or changes in overall thickness.

BEST MODE FOR CARRYING OUT THE INVENTION

Figure 1:
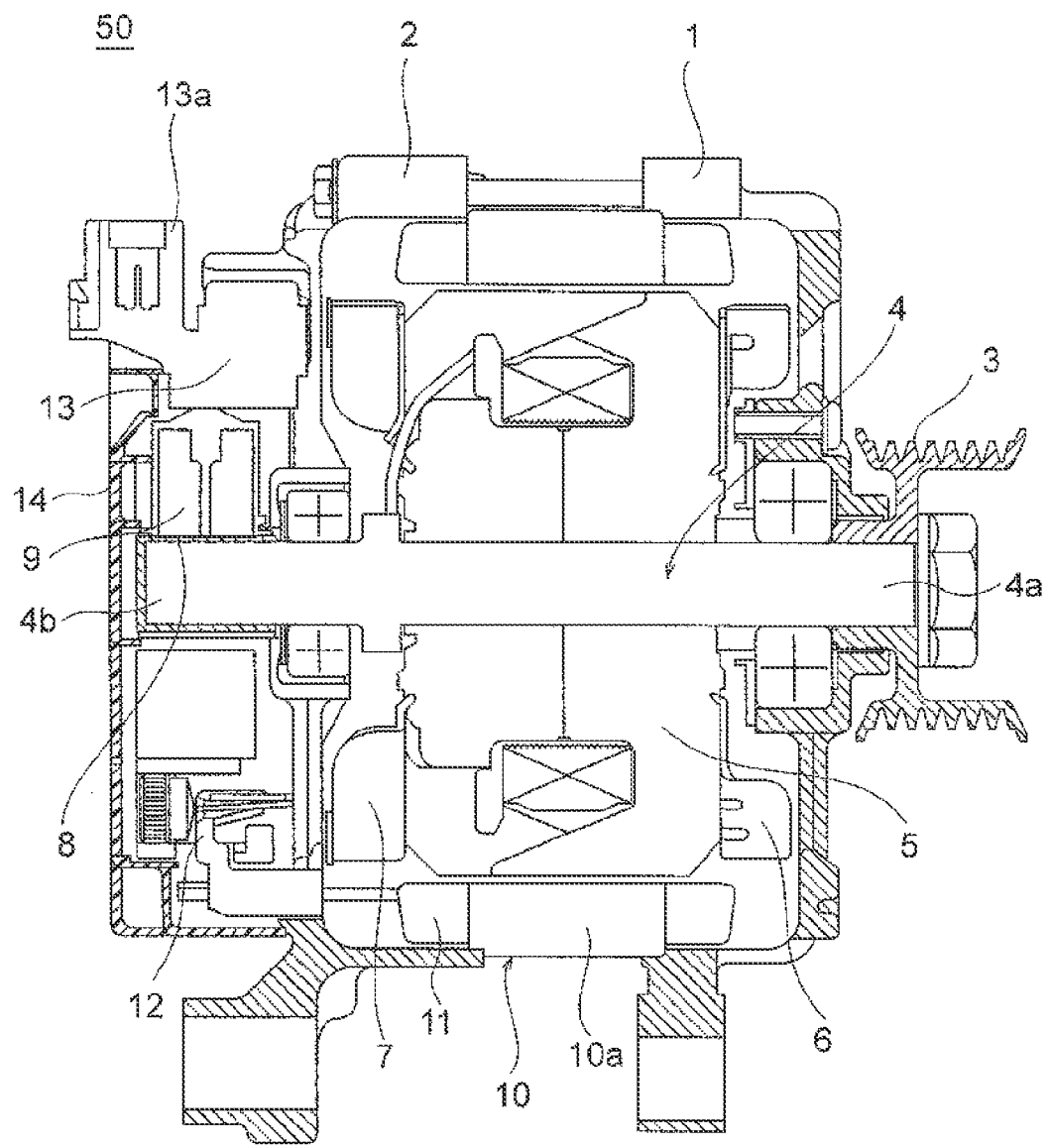
FIG. 1 is a cross-sectional diagram of a vehicle AC generator according to an embodiment of the present invention.

Embodiments of the vehicle AC generator of the present invention are explained next with reference to accompanying drawings. In the figures, identical reference numerals denote identical or corresponding portions.

FIG. 1 is a cross-sectional diagram of a vehicle AC generator according to the present embodiment. A vehicle AC generator 50 has a front bracket 1 and a rear bracket 2. A shaft 4 is rotatably disposed inward (back side) of the front bracket 1 and the rear bracket 2.

A pulley 3 is attached to one end 4a, of the shaft 4, that protrudes beyond the front bracket 1. A claw-pole type rotor 5 is attached to the shaft 4, inward of the front bracket 1. A fan 6 is attached to the front bracket 1 side of the rotor 5, as viewed in the direction in which the rotation axis of the shaft 4 extends. Similarly, a fan 7 is attached to the rear bracket 2 side of the rotor 5, as viewed in the direction in which the rotation axis of the shaft 4 extends.

A slip ring 8 for supplying current to the rotor 5 is provided at another end 4b of the shaft 4. A brush 9 is disposed in the vicinity of the slip ring 8, in such a manner so as to slide over the latter.

A stator 10 is provided outward (front side), in the rotation radius direction, of the rotor 5, in such a manner that the stator 10 opposes the rotor 5. The stator 10 has a stator core 10a and a stator coil 11 that is wound around the stator core 10a. The stator core 10a and the stator coil 11 are fixed to the front bracket 1 and the rear bracket 2.

A rectifier 12 and a regulator 13 are disposed at the stator coil 11, at a region on the other end 4b side of the shaft 4. The rectifier 12, which is electrically connected to the stator coil 11, rectifies the AC current generated in the stator coil 11 into DC current. The regulator 13 adjusts the AC voltage generated in the stator coil 11. A regulator connector 13a is exposed outside the edge of a resin cover described below.

Figure 2:
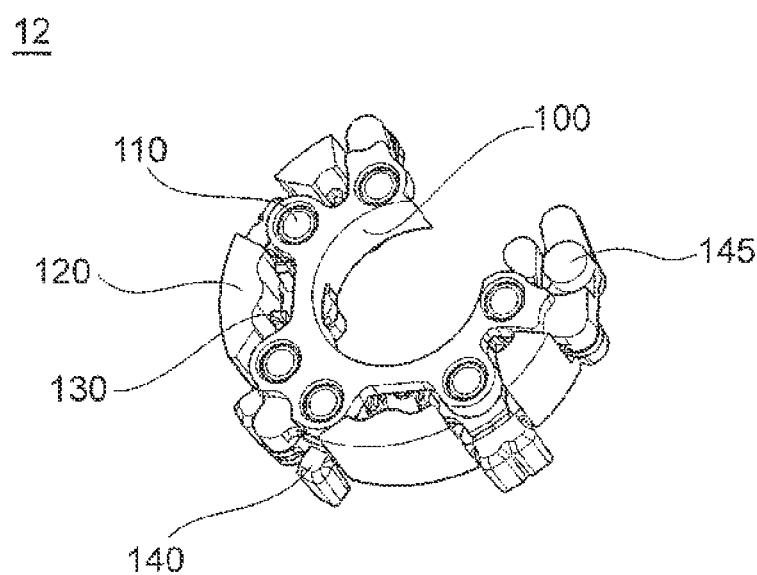
FIG. 2 is a perspective-view diagram of a rectifier.
Figure 3:
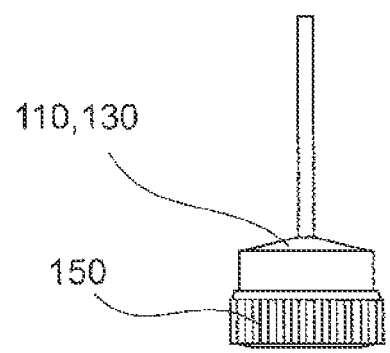
FIG. 3 is a side-view diagram of a diode.
Figure 4:
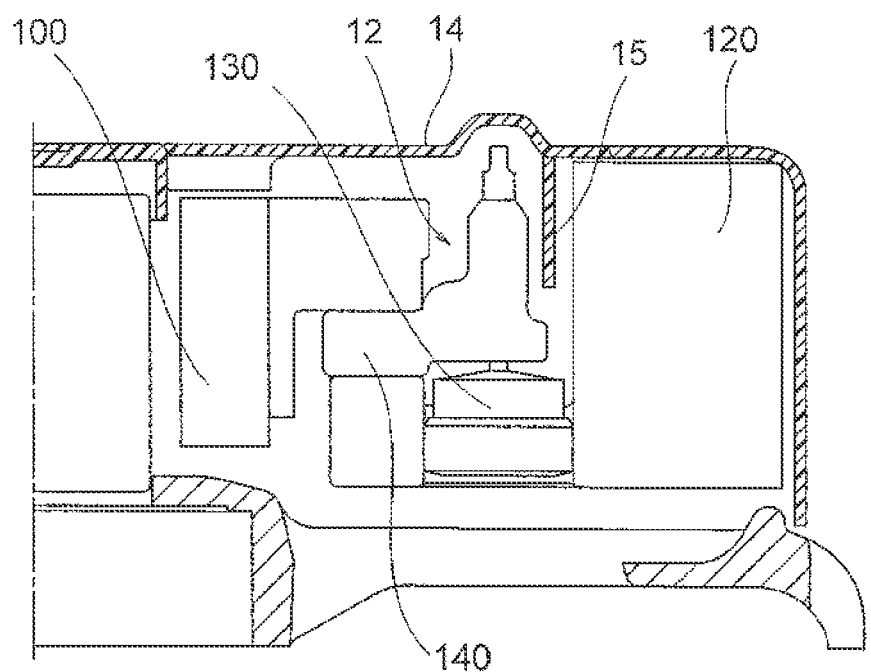
FIG. 4 is a cross-sectional diagram of a site at which a partitioning section of a resin cover is interposed between a heat sink (+) and a heat sink (−)

The rectifier will be explained on the basis of FIG. 2 to FIG. 4. FIG. 2 is a perspective-view diagram of the rectifier, and FIG. 3 is a side-view diagram of a diode. FIG. 4 is a cross-sectional diagram of a site at which a below-described partitioning section of the resin cover is interposed between a heat sink (+) and a heat sink (−). The rectifier 12 comprises a heat sink (+) 100, diodes (+) 110, a heat sink (−) 120, diodes (−) 130, and a circuit board 140. The reference symbol 145 denotes a battery terminal connection section.

The diodes (+) 110 have a shape such as the one illustrated in FIG. 3. The diodes (−) 130 are configured to the same shape as that of the diodes (+) 110.

A heat generation section of each diode (+) 110 is electrically connected to the cathode side, and a heat generation section of each diode (−) 130 is electrically connected to the anode side. The cathodes of the diodes (+) 110 and the anodes of the diodes (−) 130 are electrically connected to respective conductive bases 150.

The base 150 of each diode (+) 110 is mechanically fixed to the heat sink (+) 100, and the base 150 of each diode (−) 130 is mechanically fixed to the heat sink (−) 120. The heat sink (+) 100 is at the same potential as that of the cathodes of the diodes (+) 110, and the heat sink (−) 120 is at the same potential as that of the anodes of the diodes (−) 130.

With reference back to FIG. 1, a cup-shaped or bowl-shaped resin cover 14 is provided outward of the other end 4b of the shaft 4. The resin cover 14 covers and protects the brush 9, the rectifier 12 and so forth. The resin cover 14 is made up of a flame-retardant grade material (V-0 in UL standards), or of a flame-retardant material corresponding thereto.

Figure 5:
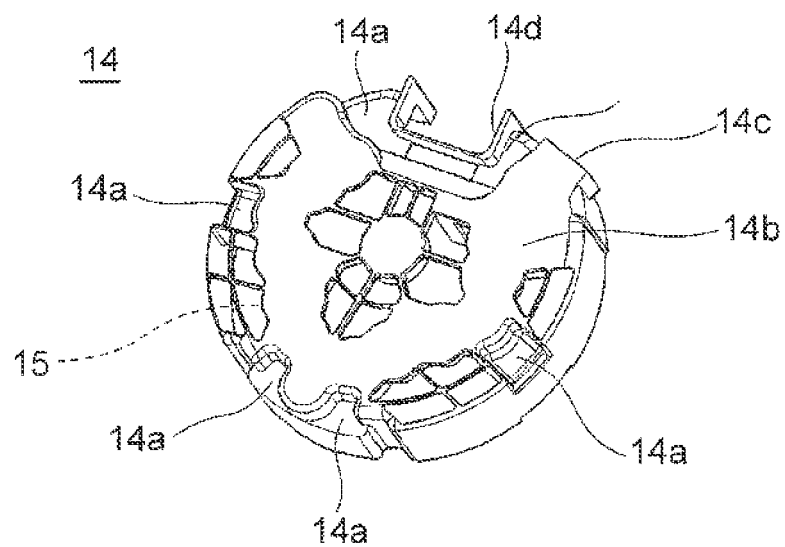
FIG. 5 is a perspective-view diagram illustrating a resin cover from outside.
Figure 6:
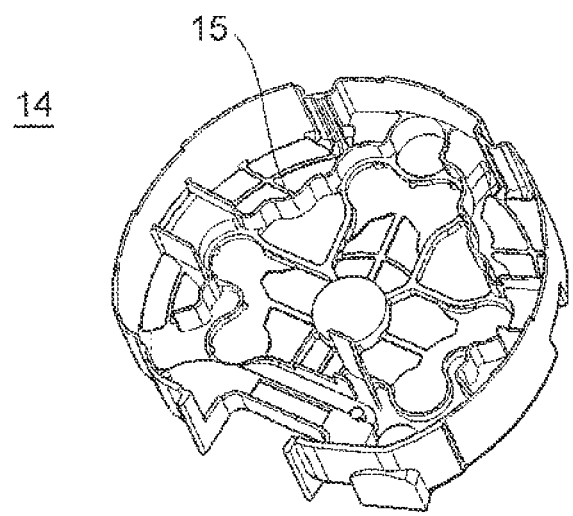
FIG. 6 is a perspective-view diagram illustrating, from inside, the shape of a resin cover having integrally formed therein a partitioning section that extends in the axial direction and the peripheral direction.

The resin cover 14 of the present embodiment will be explained based on FIG. 4 to FIG. 6. FIG. 5 is a perspective-view diagram illustrating the resin cover from outside. FIG. 6 is a perspective-view diagram illustrating, from inside, the resin cover having integrally formed therein a partitioning section that extends in the axial direction and the peripheral direction.

Firstly, a partitioning section 15 is formed on the inner side of the resin cover 14, as illustrated in FIG. 4 and FIG. 6. The partitioning section 15 is integrally formed with other portions of the resin cover 14. The partitioning section 15 extends parallelly to the direction in which the shaft 4 extends, i.e. the rotation axis direction of the shaft 4. In other words, the partitioning section 15 rises from the other end 4b of the shaft 4 towards the one end 4a, inward of the end face of the resin cover 14.

The partitioning section 15 extends both in the axial direction and in the peripheral direction. The partitioning section 15 extends in such a way so as to separate metal parts having a potential difference. Specifically, the partitioning section 15 extends so as to separate the heat sink (+) 100 from the heat sink (−) 120, as illustrated in FIG. 4 and FIG. 6. That is, the partitioning section 15 extends in the peripheral direction (peripheral direction relating to the rotation of the shaft 4) so as to thread its way between the heat sink (+) 100 and the heat sink (−) 120. The peripheral direction is not meant herein to be limited to a circumference of strictly identical radius, and is meant to encompass instances where the partitioning section 15 extends with varying distance (corresponding to the diameter) from the rotation axis of the shaft 4, as the partitioning section 15 conforms to the shapes of the mutually opposing portions of the heat sink (+) 100 and the heat sink (−) 120. The partitioning section 15 illustrated in FIG. 6 is an example of a configuration wherein the partitioning section 15 extends while there varies the position thereof in the radial direction. As illustrated in FIG. 6, the partitioning section 15 has a curved shape in a projection view along the front-back direction of the resin cover 14.

The outer side of the resin cover 14 has recessed shapes or protruding shapes; in the example illustrated in FIG. 5, the resin cover 14 of the present embodiment has a plurality of recessed shape sections 14a. Specifically, the recessed shape sections 14a are portions that are sunk in accordance with a relative relationship with respect to a uniform surface (rearmost end face) 14b, which is a main reference surface of the resin cover 14. The peripheral section of the battery terminal cover section 14c and the peripheral section of the regulator connector cover section 14d on the outer side of the resin cover are lower than the uniform surface 14b of the resin cover 14, i.e. the above-described recessed shape sections 14a are positioned at the peripheral section of the battery terminal cover section 14c and at the peripheral section of the regulator connector cover section 14d, as illustrated in FIG. 5. In other words, the inward space of the resin cover 14 is expanded at the battery terminal cover section 14c and the regulator connector cover section 14d.

In the vehicle AC generator configured as described above, the partitioning section is integrally formed on the inner side of the resin cover, in such a manner that the partitioning section extends in the peripheral direction and rises in the axial direction of the shaft. Therefore, it becomes possible to increase the rigidity and strength of the resin cover as a whole, and in particular, to enhance impact resistance, regardless of the direction of the impact, without incurring additional costs that are involved in, for instance, modifying the material of the resin cover to an impact resistant material, or making the resin cover thicker. As compared with existing resin covers, the resin cover of the present embodiment can be realized by modifying only the shape of a molding die, and by slightly modifying a material amount.

In addition, the partitioning section has a curved shape in a projection view along the front-back direction of the resin cover. The strength of the partitioning section itself can be therefore enhanced, as a result of which the rigidity of the resin cover can be likewise enhanced. The partitioning section extends so as to separate metal parts having a potential difference. Therefore, short-circuits can be prevented regardless of the direction of the impact. The outer side of the resin cover has recessed shapes or protruding shapes, and hence the rigidity of the resin cover can also be enhanced thereby. The space in the battery terminal cover section itself or the regulator connector cover section itself can be expanded, and harness attachability as well can be enhanced, by imparting recessed shapes to the peripheral section of the battery terminal cover section and the peripheral section of the regulator connector cover section. If the resin cover is configured out of a flame-retardant grade material, moreover, it becomes possible to suppress yet more surely the outbreak of fire even if sparks are generated upon a short-circuit in the event of a collision.

The features of the present invention have been explained in detail with reference to the preferred embodiment above, but it is evident that a person skilled in the art can devise all manner of variations on the basis of the teachings and basic technical concept of the present invention.

EXPLANATION OF REFERENCE NUMERALS 4 shaft, 5 rotor, 10 stator, 12 rectifier, 13 regulator, 14 resin cover, 15 partitioning section, 50 vehicle AC generator, 100 heat sink (+), 110 diode (+), 120 heat sink (−), 130 diode (−)

The invention claimed is:
1. A vehicle AC generator, comprising:
a rotor provided on a shaft;
a stator disposed so as to oppose the rotor;
a rectifier rectifying current generated in the stator;
a regulator adjusting voltage generated in the stator; and
a resin cover covering the rectifier,
wherein a partitioning section is integrally formed on the inner side of the resin cover;
wherein the partitioning section extends in a peripheral direction and rises in an axial direction of the shaft,
wherein the rectifier has a plurality of first diodes, respective heat generation sections of which are electrically connected to respective cathodes, and a plurality of second diodes, respective heat generation sections of which are electrically connected to respective anodes; and wherein the partitioning section extends so as to separate a first heat sink to which the cathodes of the plurality of first diodes are electrically connected, from a second heat sink to which the anodes of the plurality of second diodes are electrically connected.

2. The vehicle AC generator according to claim 1, wherein the partitioning section has a curved shape in a projection view along a front-back direction of the resin cover.

3. The vehicle AC generator according to claim 1, wherein the partitioning section extends so as to separate metal parts of different electrical potentials.

4. The vehicle AC generator according to claim 1, wherein the outer side of the resin cover has a recessed shape or a protruding shape.

5. The vehicle AC generator according to claim 1, wherein the outer side of the resin cover is lower than a rearmost end face of the resin cover, at a peripheral section of a battery terminal cover section or a peripheral section of a regulator connector cover section.

6. The vehicle AC generator according to claim 1, wherein the resin cover is made up of a flame-retardant grade material.

\* \* \* \* \*